Figure 1:
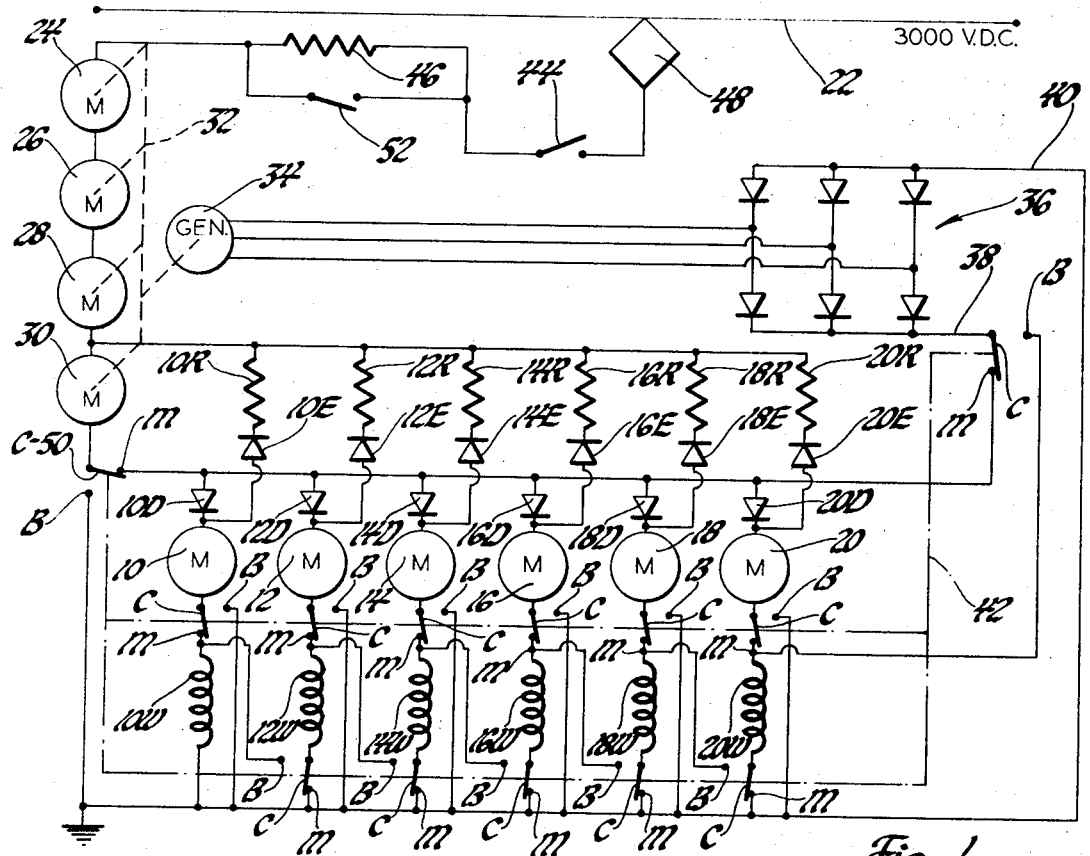

United States Patent [19]
Johnson

[11] 3,743,901
[45] July 3, 1973

[54] LOCOMOTIVE EXCITATION AND REGENERATIVE BRAKING CONTROL ARRANGEMENT

[75] Inventor: Lauren L. Johnson, Westchester, Ill.

[73] Assignee: General Motors Corporation, Detroit, Mich.

[22] Filed: Nov. 15, 1971

[21] Appl. No.: 198,771

[52] U.S. Cl. .................................. 318/87, 318/100
[51] Int. Cl. ............................................. H02p 3/00
[58] Field of Search ...................... 318/86–89, 100

[56] References Cited
UNITED STATES PATENTS

| | | | |
|---|---|---|---|
| 1,231,605 | 7/1917 | Hellmund | 318/87 |
| 1,287,688 | 12/1918 | Hellmund | 318/87 |
| 2,360,766 | 10/1944 | DeGiacomoni | 318/87 X |
| 1,308,069 | 7/1919 | Hellmund | 318/88 |
| 1,246,424 | 11/1917 | Hellmund | 318/87 |
| 1,189,193 | 6/1916 | Cumont | 318/87 X |
| 1,411,419 | 4/1922 | Cumont | 318/87 X |
| 1,358,580 | 11/1920 | Rouviere | 318/86 |

*Primary Examiner*—T. E. Lynch
*Attorney*—E. W. Christen and C. R. Meland

[57] ABSTRACT

An electric locomotive is provided with drive motors driving a generator whose rectified output is combined with the current supplied the drive motors to power the locomotive's tractional motors. Regenerative braking is effected when the tractional motors are operated as generators to power one of the drive motors which in turn drives the other drive motors as generators to return power to the supply line. The current supplied by the several tractional motors to the powered drive motor is balanced by including, in alternative embodiments, resistors or feedback in the tractional motor circuits.

3 Claims, 2 Drawing Figures

Patented July 3, 1973

3,743,901

LOCOMOTIVE EXCITATION AND REGENERATIVE BRAKING CONTROL ARRANGEMENT

This invention relates to an electric locomotive circuit arrangement for supplying tractional motors during normal operation and for providing regenerative braking.

Electric locomotives include tractional motors to drive locomotive wheels during locomotive operation. A variety of excitation circuits are possible to supply power to the tractional motors. In the instant invention, an auxiliary generator is driven by drive motors supplied from an overhead right-of-way power supply. Current from the right-of-way through the drive motors is combined with current supplied by the generator to power the tractional motors, thus reducing the duty on both the generator and the drive motors.

For locomotive braking in the instant system, regeneration is effected in which one of the drive motors is supplied electrical power from the tractional motors operating as generators. The powered drive motor drives the remaining drive motors as generators to return power to the right-of-way power system. To balance the current of the tractional motors during regeneration, two alternative circuit arrangements are disclosed. Resistors can be included in series with the tractional motors when operating in the braking mode or current feedback can be provided to achieve the requisite load balance.

In the instant invention, two modes of operation are provided for the tractional motors of an electric locomotive. In the first mode, the tractional motors are powered to enable them to drive the locomotive; in the second mode, braking is accomplished with the tractional motors operating as generators. The drive motors and the generator which cooperate to supply the tractional motors during normal power operation are required during regenerative braking to perform functions different from those performed during power operation. In particular, all but one of the drive motors operates as a generator in the regenerative braking mode. This reversal of operating functions with regard to the tractional motors and the drive motors permits power to be returned to the right-of-way power supply during braking.

Accordingly, it is an object of the present invention to provide a drive arrangement for an electric locomotive including regenerative braking wherein a generator supplies field excitation to tractional motors provided with resistors or feedback to balance the tractional motor armature current during regenerative braking and wherein all but one of a plurality of drive motors are driven as generators to return power to a right-of-way supply line and wherein the one drive motor not operated as a generator is energized by the tractional motors to drive the remaining drive motors.

Figure 2:
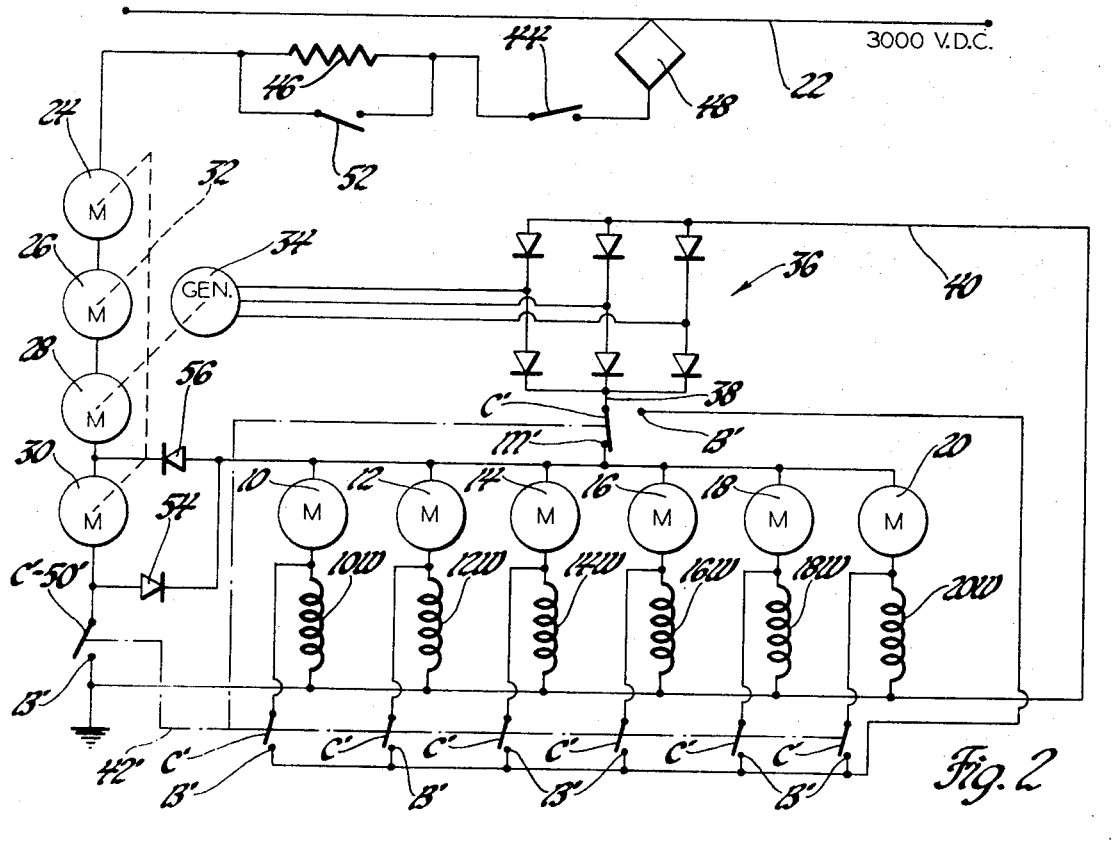

Other objects, advantages, and features of the invention will become more readily apparent as reference is had to the accompanying specification and drawings wherein:

FIG. 1 is a circuit schematic for an electric locomotive drive including regenerative braking according to the present invention wherein load balance is provided by resistors included in the armature circuits of the tractional motors during regenerative braking; and FIG. 2 is a circuit schematic for an electric locomotive drive including regenerative braking according to the present invention wherein load balance is provided by a feedback connection operative during regenerative braking.

Reference should now be made to FIG. 1 wherein an electric locomotive drive and braking circuit is shown including six tractional motors 10, 12, 14, 16, 18, and 20 coupled respectively with wheels (not illustrated) of the locomotive. The electric locomotive receives power from a 3,000 volt DC overhead right-of-way supply 22. The right-of-way is of a type generally known for powering electric locomotives and, accordingly, details are neither shown nor discussed.

The overhead power supply 22 is used to energize four drive motors 24, 26, 28, and 30 mechanically coupled through linkage 32 to a dynamoelectric generator 34. The mechanical linkage 32 interconnects the four drive motors during all operation in the power or braking modes. This linkage can take a variety of known forms and is accordingly neither shown nor discussed in detail.

The four drive motors are equipped with separate field windings supplied from an auxiliary locomotive source (not shown) for controlled speed operation. The motors may also be equipped with series cumulative fields or separately excited fields supplied directly from the right-of-way. The alternatives regarding field control for the drive motors are conventional and generally known for electric locomotives. Accordingly, no detailed field arrangement is set forth or discussed.

The generator 34 includes an output winding connected in either a Delta or Y configuration depending on system conditions and demands. This Delta-Y flexibility is known and therefore, the circuit schematic does not include details. A field winding of the generator 34 is supplied from an auxiliary source (not illustrated) and is controllable in a conventional manner as is done with generally known diesel electric locomotives. As with the other conventional controls cited herein, the generator field and its associated circuitry are not shown or discussed in detail.

A full-wave bridge rectifier 36 is connected with the output from the generator 34 and provides a DC voltage between the lines 38 and 40. This rectified output from the generator has a voltage and current capability determined by the operation of the generator 34 and its related control.

A switch 42 controls a plurality of movable contacts denoted C and a movable contact C-50 to afford selection of a power mode or a braking mode. As shown in the schematic, the movable contacts engage their respective associated fixed contacts M to provide a motoring mode; when the movable contacts engage the fixed contacts B, the braking mode is selected.

When normal drive operation is desired, the switch 44 is closed connecting the drive motors with the 3,000 volt right-of-way through the current limiting resistor 46 and the pick-up member 48. To start the operation of the drive, the movable contact C-50 must engage the associated fixed contact B. This can be accomplished by actuating the switch 42 moving all the movable contacts C to their respective fixed contacts B or by independent regulation of the movable contact C-50.

When the switch 44 is closed and the contact C-50 engages the associated contact B, current is supplied the drive motors accelerating them and initiating operation by the generator 34. As the drive motors accelerate, the current therethrough subsides and the current limiting resistor 46 is removed from the circuit by closing the switch 52. This switch is controlled by the current or speed of the drive motors to remove the current limiting resistor at the desired time. The requisite sensing and control for this switch are generally known and are not shown or described in detail. Ths switch C-50 is also moved from the associated contact B to the associated contact M when the current through the drive motors is reduced to a predetermined level or when the speed attains a preset value. As noted for the switch 52, the requisite sensing and control are conventional.

Each tractional motor is supplied current from the line 38 through an associated diode 10D, 12D, 14D, 16D, 18D, or 20D. The current path for each motor continues through the respective motor, a first movable contact of the switch 42, the associated winding 10W, 12W, 14W, 16W, 18W, or 20W, and a second movable contact of the switch 42 to the line 40.

The current supplied from the generator 34 through the bridge 36 is augmented by the current through the drive motors which is connected to the diodes 10D, 12D, 14D, 16D, 18D, and 20D through the movable contact C-50. In this manner, the duty on the motors and the generator 34 is minimized by virtue of the combined excitation of the tractional motors: the tractional motors receive a portion of their excitation directly from the overhead supply 22 through the drive motors and a portion from the generator 34.

When it is time to initiate braking of the tractional motors, the switch 42 is positioned such that all the movable contacts engage their respective fixed contacts denoted B. At this time, the respective tractional motors are driven as generators with their field windings 10W, 12W, 14W, 16W, 18W, and 20W serially connected across the voltage between lines 38 and 40. Armature current from the tractional motors is carried by the diodes 10E, 12E, 14E, 16E, 18E, and 20E through the current balancing resistors 10R, 12R, 14R, 16R, 18R, and 20R to energize the single drive motor 30. The return path for the current supplied the drive motor 30 is through the movable contact C-50 to the respective tractional motor. The resistors included in the armature circuits provide for balance in the armature currents of the various tractional motors. Current variations result from differences among the motors or differences in locomotive wheel size and the associated motorwheel interconnections and must be eliminated during regeneration. The recited load balancing is necessary to ensure uniform loading of all the tractional motors to maximize braking; otherwise, one tractional motor could be overloaded while another was unloaded. Typically, the balance resistors have a low resistance: a tractional motor having a 1,000 amp rating would require a resistor having a resistance on the order of 0.2 ohms.

It should be observed that the diodes 10D, 12D, 14D, 16D, 18D, and 20D are reverse biased during regeneration thereby preventing currents from circulating in the armature circuits. In addition, it should be understood that the diodes 10E, 12E, 14E, 16E, 18E, and 20E are reverse biased during normal operation to prevent current from by-passing the drive motor 30.

The mechanical linkage 32 couples the driven motor 30 with the remaining drive motors and the generator 34. The generator 34 is operated as in the power mode to develop DC voltage between the lines 38 and 40. The three drive motors 24, 26, and 28 are provided excitation so that they are operated during regenerative braking as generators driven by the motor 30 and developing power to be returned through the pick-up member 48 to the overhead supply. The current path for power returned to the overhead supply includes a path to ground through the motor 30 and the movable contact C-50. From the foregoing description, it should be appreciated that the generator 34 is operative to provide drive power or field excitation to the tractional motors during power operation or braking, respectively. The drive motors 24, 26, 28, and 30 are all operated as motors during power operation, whereas only drive motor 30 is operated as a motor during braking, the other three being operated as generators to return power to the supply line.

It should be understood that the windings 10W, 12W, 14W, 16W, 18W, and 20W can be provided with reversing means to permit reverse drive of the locomotive. This provision is conventional and without significance to the present invention; the above operation applies equally to either mode of operation.

Reference should now be made to FIG. 2 wherein an alternative embodiment for the electric locomotive is set forth. Notations used in FIG. 1 are applied to common elements of the two circuit arrangements. Accordingly, the tractional motors 10, 12, 14, 16, 18, and 20 are driven by power from the overhead right-of-way 22 connected with drive motors 24, 26, 28, and 30. These drive motors are interconnected and connected through a mechanical coupling means or linkage 32 with the generator 34. The full-wave bridge 36 provides a DC output between lines 38 and 40 for controllable connection with the tractional motors. A mode selector switch 42' controls a plurality of movable contacts denoted C' and a movable contact C'-50' in a manner analogous to the control afforded by the switch 42.

When operation is initiated, the switch 44 is closed to supply the drive motors through the current limiting resistor 46 and the pick-up 48. The movable contact C'-50' must engage its associated fixed contact B' to complete the excitation circuit for the drive motors. In a manner similar to the operation recited above for the movable contact C-50 at the outset of locomotive operation, the switch 42' can be actuated causing all movable contacts associated therewith to engage their braking contacts B' so that the movable contact C'-50' engages its associated fixed contact B' or the requisite connection for the contact C'-50' can be otherwise obtained.

After the current subsides during speed build-up, the switch 52 is closed as discussed above. In a similar manner, the circuit through the movable contact C'-50' and its associated contact B' is opened in response to speed or current as discussed with regard to the movable contact C-50 of FIG. 1. It should be noted that the movable contact C'-50' does not engage any fixed contact during motor operation. As shown in the drawing, only one of the movable contacts C' has both a fixed contact M' and a fixed contact B'. All the movable contacts C' engage their respective fixed contacts B' during braking or starting effected by the switch 42'. However, only one movable contact C' engages a fixed contact M' during normal motor operation; all the other movable contacts C' are open circuited during normal motor operation.

A diode 54 provides a path for current from the overhead 22 through the drive motors to the tractional motors. As for the system of FIG. 1, the current from the drive motors is combined with current from the generator 34 at the tractional motors during normal motor operation.

When the braking mode is selected, the tractional motor windings 10W, 12W, 14W, 16W, 18W, and 20W are connected in shunt across the voltage between the lines 38 and 40 by the switch 42'. The tractional motors operate as generators driving the single drive motor 30 through a circuit path including a diode 56 and the movable contact C'-50'. Current balance during regenerative braking is maintained in this embodiment in accordance with feedback of armature current. The current feedback balance control is readily understood in view of the fact that the current from the bridge 36 has a sense opposite to the associated armature current in each of the field windings.

The process of returning power to the overhead supply for the FIG. 2 arrangement is the same as that discussed for FIG. 1. The motor 30 drives the remaining drive motors and the generator 34 through the linkage 32, and the drive motors 24, 26, and 28 operate as generators to return power to the overhead supply. The current path to ground for the power returned to the overhead supply includes the motor 30 and the movable contact C'-50' and its associated fixed contact B'.

Although the foregoing has proceeded in terms of particular embodiments of the present invention, it should be understood that various changes and modifications could be engrafted thereon by one skilled in the art without exceeding the spirit and scope of the appended claims.

I claim:

1. A power control system for the traction motors of an electric locomotive operable to provide power and regenerative braking modes of operation for said motors comprising, a right-of-way source of direct voltage, a plurality of direct current traction motors operable when energized to provide motive power for said locomotive, each traction motor having a field winding, a plurality of series connected drive motors, a generator having a direct voltage output, means mechanically connecting said drive motors and said generator, switching means having a first position for operating said traction motors in a power mode and a second position for operating said traction motors in a regenerative braking mode, said switching means in said first position electrically connecting said series connected drive motors in series with said traction motors across said source of voltage, said switching means in said first position further electrically connecting said traction motors across said generator whereby said traction motors can be supplied current from said generator and from said source of direct voltage through said drive motors, said switching means in said second position electrically connecting the field windings of said traction motors across said generator whereby said generator supplies current to the field windings of said traction motors during said braking mode of operation, said switching means in said second position further electrically connecting one of said plurality of drive motors across said traction motors whereby said traction motors when operating as generators in said braking mode can supply current to said one drive motor, said one drive motor during said braking mode mechanically driving the other drive motors and said generator whereby said other drive motors operate as generators to return power to said source of direct voltage and whereby said generator supplies field current to the field windings of said traction motors, and means for balancing armature current between respective traction motors when they are operating in said braking mode.

2. A power control system for the traction motors of an electric locomotive operable to provide power and regenerative braking modes of operation for said motors comprising, a right-of-way source of direct voltage, a plurality of direct current traction motors operable when energized to provide motive power for said locomotive, each traction motor having an armature and a field winding, a plurality of series connected drive motors, an alternating current generator, rectifier means connected to said generator having a direct voltage output, means mechanically connecting said drive motors and said generator, switching means having a first position for operating said traction motors in a power mode and a second position for operating said traction motors in a regenerative braking mode, said switching means in said first position electrically connecting said series connected drive motors in series with said traction motors across said source of voltage, said switching means in said first position further electrically connecting said traction motors across said rectifier means whereby said traction motors can be supplied direct current from said rectifier means and from said source of direct voltage through said drive motors, said switching means in said second position electrically connecting the field windings of said traction motors across said rectifier means whereby said rectifier means supplies current to the field windings of said traction motors during said braking mode of operation, said switching means in said second position further electrically connecting one of said plurality of drive motors across the armatures of said traction motors whereby said traction motors when operating as generators in said braking mode can supply current to said one drive motor, said one drive motor during said braking mode mechanically driving the other drive motors and said generator whereby said other drive motors operate as generators to return power to said source of direct voltage and whereby said generator and rectifier means supplies field current to the field windings of said traction motors, and a plurality of resistors connected respectively in the armature circuits of said traction motors during said braking mode to balance armature current among said traction motors.

3. A power control system for the traction motors of an electric locomotive operable to provide power and regenerative braking modes of operation for said motors comprising, a right-of-way source of direct voltage, a plurality of direct current traction motors operable when energized to provide motive power for said locomotive, each traction motor having an armature and a field winding, a plurality of series connected drive motors, an alternating current generator, rectifier means connected to said generator having a direct voltage output, means mechanically connecting said drive motors and said generator, and switching means having a first position for operating said traction motors in a power mode and a second position for operating said traction motors in a regenerative braking mode, said switching means in said first position electrically connecting said series connected drive motors in series with said traction motors across said source of voltage with the armature and field of each traction motor connected in series, said switching means in said first position further electrically connecting said traction motors across said rectifier means whereby said traction motors can be supplied current from said rectifier means and from said source of direct voltage through said drive motors, said switching means in said second position electrically connecting the field windings of said traction motors across said rectifier means whereby said rectifier means supplies current to the field windings of said traction motors during said braking mode of operation, said switching means in said second position further electrically connecting one of said plurality of drive motors across said traction motors whereby said traction motors when operating as generators in said braking mode can supply current to said one drive motor, said one drive motor during said braking mode mechanically driving the other drive motors and said generator whereby said other drive motors operate as generators to return power to said source of direct voltage and whereby said generator supplies field current to the field windings of said traction motors, said armature and field of each traction motor be maintained in a series connection during said braking mode whereby current developed in an armature during regeneration passes through a series connected field winding, the sense of said last named current being opposite to that supplied to said field windings by said rectifier means.

* * * * *